(No Model.)

E. RUTZ.
Poultry Coop.

No. 238,055. Patented Feb. 22, 1881.

Witnesses
F. B. Townsend
F. W. Kasehagen

Inventor
Edward Rutz,
By Latz & Dyer,
Attys.

UNITED STATES PATENT OFFICE.

EDUARD RUTZ, OF CHICAGO, ILLINOIS.

POULTRY-COOP.

SPECIFICATION forming part of Letters Patent No. 238,055, dated February 22, 1881.

Application filed December 30, 1880. (No model.)

*To all whom it may concern:*

Be it known that I, EDUARD RUTZ, of Chicago, in the county of Cook and State of Illinois, have invented a certain new and useful Improvement in Poultry Coops and Crates, of which the following is a specification.

The object I have in view is to produce a coop or crate for shipping poultry which will have means for supplying the poultry with feed and water during the journey, and will not need the attention of the train-hands, such feed and water being placed in the coop or crate before the same is put on the cars, and being contained in vessels so situated that while all the poultry in the crate can readily gain access to them, they cannot be displaced or upset. I also wish to provide means for supplying each crate with a considerable quantity of water, which will automatically flow into the water-pan, so as to keep the same supplied with water.

Heretofore it has been customary to transport chickens and other poultry in crates without proper means for providing them with food or water, and the result is that the chickens grow poor and have to be fattened before they are fit for market.

My invention consists in the novel features of the crate or coop employed by me, as fully hereinafter explained, and pointed out by the claims.

Figure 1:
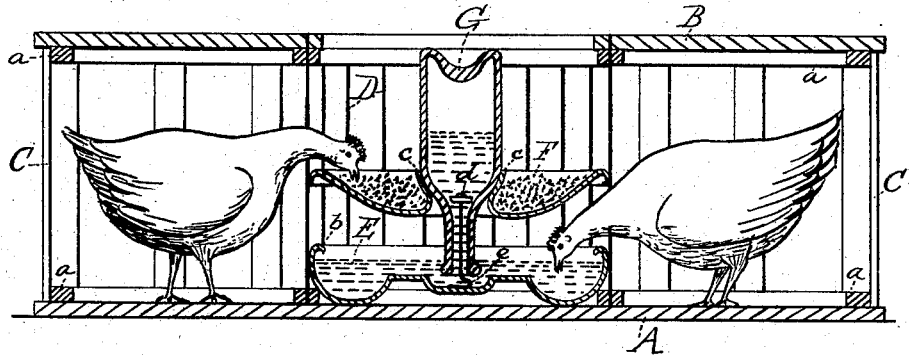
Figure 2:
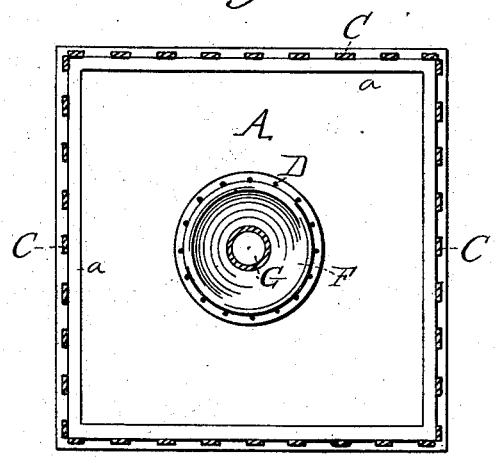

In the accompanying drawings, forming a part hereof, Figure 1 is a vertical section of my coop or crate, and Fig. 2 a horizontal section of the same.

Like letters denote corresponding parts in both figures.

A is the bottom and B the top of the crate or coop, which may be of wood boards or of paper, and will correspond with the shape of the crate, which is preferably square, but can be oblong or circular in form.

The sides of the crate or coop are composed of slats C, nailed to cleats $a$, secured to the bottom and top, A B. The top, B, of the crate or coop has a central opening, preferably circular in form, and vertical wires D extend from the top, around the edge of this opening, down to the bottom, and are secured to both said top and bottom. These wires are placed such a distance apart that the chickens can readily put their heads through the spaces between them. In the bottom of the central space thus divided off from the rest of the crate is situated the water-pan E, having, preferably, inwardly-turned edges $b$, to prevent the water from slopping over the sides of the same, and a recess in the center.

Above the water-pan is a feed-vessel or cup, F, which is supported in any suitable manner. This feed-vessel has a central opening down through it, and the edges $c$ of this opening are turned back to form a support for a bottle, G, when the same is inverted, as shown in the drawings. This bottle G, which contains the supply of water, is provided with an elastic valve, $d$, which can be forced through the neck of the bottle into the same, but cannot be withdrawn. The wire $e$, to which the valve is attached, has its outer end bent laterally to prevent it from dropping out of reach within the bottle. When the bottle is inverted and dropped into the opening in the feed-cup the wire $e$ will strike the bottom of the water-pan and will push the valve from its seat, allowing air to enter the bottle and the water to run out until such water rises up, so as to close the bottle, when the flow will stop. As the chickens drink the water from the pan fresh water will be automatically supplied from the bottle.

Before shipping the filled crate a quantity of sand is thrown into the water-pan, the bottle filled with water is placed in position, and the feed-vessel is filled with any suitable feed.

The crate will be provided with a suitable door in its top or side for putting the poultry into and taking them from the same.

The bottom of the crate should be solid, as shown, but the top can be solid or be formed of slats.

The same principle can be applied to a coop for fattening poultry, which can be made of U shape, with water and feed vessels placed in the center between the two parts, and adapted to be drawn out for removal at one end. The coop would be divided off into separate compartments, one for each chicken. The water-bottles would not be necessary.

What I claim as my invention is—

1. The poultry coop or crate for shipping purposes, having its center open at the top and provided with vertical wires or rods D, dividing the open center from the body of the coop or crate, constructed and arranged substantially as described and shown, for the purpose set forth.

2. The combination, with a coop or crate having an open center divided from the rest of the coop, of the water and feed vessels, supported one above the other in such space, substantially as described and shown.

3. The combination, with a coop or crate having an open center divided from the rest of the coop, of the water and feed vessels, supported one above the other in such space, and the water-bottle, substantially as described and shown.

EDUARD RUTZ.

Witnesses:
F. W. KASEHAGEN,
OLIVER W. MARBLE.